United States Patent [19]
Hosogaya et al.

[11] Patent Number: 5,634,976
[45] Date of Patent: Jun. 3, 1997

[54] COATING APPARATUS

[75] Inventors: Ryuji Hosogaya, Saku; Eizo Tsunoda, Komoro; Akira Hatakeyama, Saku; Yoshihisa Osawa, Miyota-machi; Hideki Tanaka, Saku; Seiichi Tobisawa, Hino, all of Japan

[73] Assignees: TDK Corporation; Konica Corporation, both of Tokyo, Japan

[21] Appl. No.: 408,276

[22] Filed: Mar. 22, 1995

[30] Foreign Application Priority Data

Mar. 25, 1994 [JP] Japan .................... 6-077771

[51] Int. Cl.$^6$ .................... B05C 3/02
[52] U.S. Cl. .................... 118/410; 118/419
[58] Field of Search .................... 118/410, 411, 118/419; 425/461

[56] References Cited

U.S. PATENT DOCUMENTS 5,004,628   4/1991   Terai et al. .................... 118/410

OTHER PUBLICATIONS

Patent Abtracts of Japan, vol. 17, No. 452 (C–1099), Aug. 19, 1993, JP–A–05–104053, Apr. 27, 1993.
Patent Abstracts of Japan, vol. 16, No. 512 (C–0998), Oct. 22, 1992, JP–A–04–190870, Jul. 9, 1992.

English Abstract of Japanese patent 1–184071, published Jul. 21, 1989. "Painting Apparatus".

English Abstract of Japanese patent 63–20070, published Jan. 27, 1988. "Coater".

English Abstract of Japanese patent 63–20069, published Jan. 27, 1988. "Coater".

*Primary Examiner*—Brenda A. Lamb
*Attorney, Agent, or Firm*—Oblon, Spivak, McClelland, Maier & Neustadt, P.C.

[57] ABSTRACT

A coating apparatus having an extrusion type coating head to form a coating on the surface of a support by extruding a coating liquid continuously or successively from a slit, wherein the slit is tapered so as to expand or become wider gradually from its inlet end so as to allow the coating liquid to be extruded toward its outlet end and apply the coating liquid onto the surface of the support and wherein an opening slit width (d1) at the inlet end of the slit and an opening slit width (d2) at the outlet end thereof satisfies the following relations:

$$5\% \leq [(d2-d1)/d1] \times 100 \leq 20\%.$$

The arrangement of the slit can form a coating in a uniform film thickness by preventing the occurrence of irregularities or streaks on the surface of the coating or by suppressing a variation in film thickness.

6 Claims, 2 Drawing Sheets

COATING APPARATUS

BACKGROUND OF THE INVENTION

1. Field of the Invention

The present invention relates to a coating apparatus having an extrusion type coating head and, more particularly, to a coating apparatus with a slit shape of the extrusion type coating head modified so as to enable the formation of a coating in a uniform film thickness on to a support.

2. Description of the Related Art

Hitherto, there has been utilized a variety of methods for applying a coating liquid onto a support, which include a roll coating method, gravure coating method, slide bead coating method, doctor coating method and the like. Recently, an extrusion coating method has attracted attention due to high productivity, good operatability, and high controllability of the thickness of a coat film.

The extrusion coating method is arranged to form a coating in a given film thickness on a support by pressing an edge surface of an extrusion type coating head onto the support at a given amount of tension in a range between each of carrier means such as support rolls and varying a distance between the extrusion type coating head and the support in accordance with an amount of a coating liquid extruded from a slit of the extrusion type coating head through which the coating liquid is applied to the support.

The extrusion type coating head to be employed for extrusion coating may usually comprises a front edge (located at the upstream side with respect to the direction of travel of the support), a back edge (located at the downstream side with respect to the direction of travel of the support), a slit disposed between the front edge and the back edge and a pocket (or a coating liquid reservoir for storing a coating liquid) communicated with the slit. With this arrangement, the coating liquid is first supplied to the pocket from an outside coating liquid supply system and extruded from the slit at a flow rate in proportion to the fluid flow pressure of the coating liquid supplied, thereby applying the coating liquid onto the surface of the support.

For such a conventional extrusion type coating head, its slit usually has its two facing inner slit wall surfaces disposed parallel to each other or it is shaped in a tapered fashion.

A variety of conventional extrusion type coating heads having their tapered-shaped slits have been proposed, for example, in Japanese Patent Unexamined Publications (kokai) Nos. 63-20,069, 63-20,007 and 1-184,071. For each of these conventional tapered-shaped slits, a coating slit consisting of the front edge and the back edge is arranged in such a tapered manner that the opening width of the slit becomes gradually narrower from an inlet for supplying a coating liquid (a boundary portion from the pocket) to an outlet for extruding the coating liquid and applying onto the support. It is disclosed therein that this arrangement can provide a coating of a uniform film thickness by permitting a loss in pressure smaller at the time of extruding the coating liquid from the slit and as a result suppressing a variation in coating film thickness. The prior art as described hereinabove, however, does not disclose or even suggest a structure of the slit in which its coating slit is disposed in such a tapered (inverse-tapered) manner as its width becomes gradually wider from the inlet toward the outlet.

In an actual extrusion coating step for coating with a coating liquid, there may arise the occasion that the coating step is temporarily terminated and it is resumed after a certain period of time. In this case, there is a risk that the coating liquid is caused to coagulate into aggregates due to gelation or for other reasons while remaining in the pocket of the extrusion type coating head during a temporary termination of the coating step for a certain period of time and that the aggregates may be fed in so as accompany the flow of the coating liquid from the pocket through the slit inlet into the slit when the coating is resumed.

As each of the conventional extrusion type coating apparatuses, however, has its slit tapered in such a manner that its width becomes narrower from its inlet end toward its outlet end, the aggregates fed together with the coat-liquid from the inlet into the slit may be caught at the outlet and are difficult to be removed from the outlet. They also may cause coating irregularities or streaks on the surface of the coat and present problems with obtaining a uniform film thickness of the coating.

SUMMARY OF THE INVENTION

The primary object of the present invention is to provide a coating apparatus so as to prevent the film thickness of the coating from becoming irregular on the surface of the coating formed on a support and to enable the formation of a coating in a uniform film thickness.

Another object of the present invention is to provide a coating apparatus so as to prevent a formation of a coating streak on the surface of a coating formed on a support and to enable the formation of a coating of a uniform film thickness.

A further object of the present invention is to provide a coating apparatus so as to form a coating of a uniform film thickness with lesser variation in film thickness.

In order to achieve the objects as described hereinabove, the present invention provides a coating apparatus with a extrusion type coating head disposed so as to apply a coating liquid fed continuously or successively from a slit of the extrusion type coating head onto the surface of a support, characterized in that the slit is so arranged as to expand or become gradually wider from the end of an inlet through which the coating liquid is supplied to the end of an outlet through which it is extruded; wherein the width ($d1$) of the slit at the end of the inlet and the width ($d2$) of the slit at the end of the outlet satisfy the following relationship:

$$5\% \leq [(d2-d1)/d1] \times 100 \leq 20\%.$$

In a preferred aspect of the arrangement as described hereinabove, the relationship between the width ($d1$) and the inlet end of the slit with the width ($d2$) at the outlet end of the slit satisfies the following equation:

$$7\% \leq [(d2-d1)/d1] \times 100 \leq 15\%.$$

In addition, the present invention provides a coating apparatus characterized in that the width ($d1$) is the inlet end of the slit is set to be in the range from 0.05 mm to 0.2 mm.

In a preferred aspect of the feature as described immediately hereinabove, the width ($d1$) at the inlet end of the slit is set to be in the range from 0.1 mm to 0.16 mm.

The present invention can achieve the objects as described hereinabove by tapering the slit in such a shape so as to satisfy the conditions described hereinabove, thereby solving the problem that aggregates of a coating liquid formed in the pocket and carried into the slit through its inlet end are caught at the slit outlet end which make it difficult to remove such aggregates therefrom.

Various other objects, features and attendant advantages of the present invention will be more fully appreciated as the same becomes better understood from the following detailed description when considered in connection with the accompanying drawings in which like reference characters designate like or corresponding parts throughout the several views and wherein

DESCRIPTION OF THE PREFERRED EMBODIMENTS

The present invention will be described in greater detail by way of examples with reference to the accompanying drawings.

Figure 1:
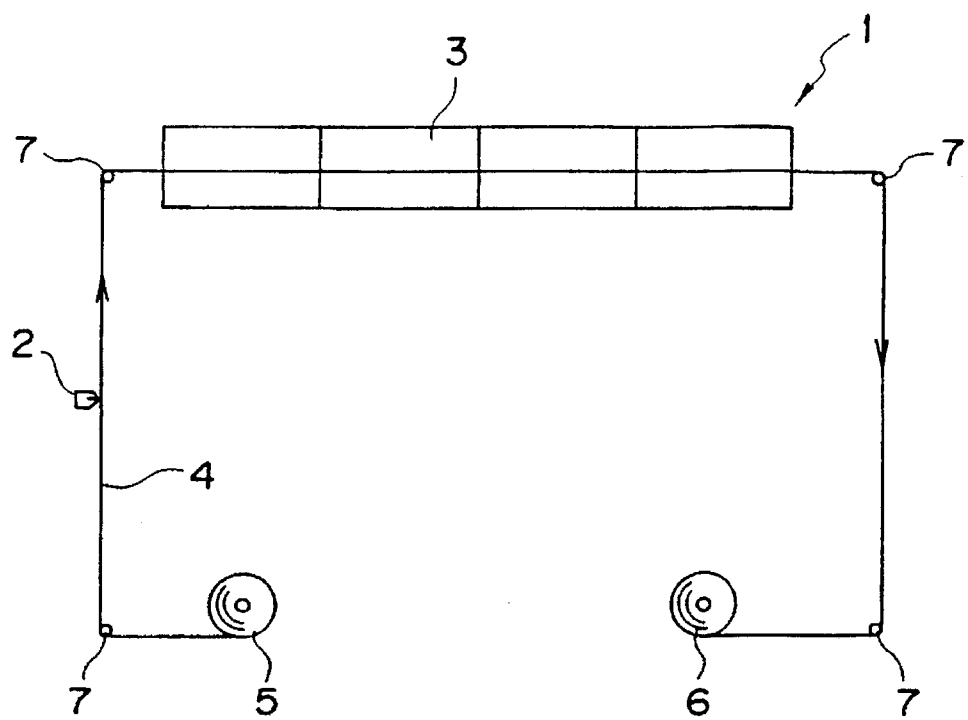
FIG. 1 is a view showing an outline of a coating apparatus according to an embodiment of the present invention.

FIG. 1 is a view showing an outline of an embodiment of the coating apparatus according to the present invention. As shown in FIG. 1, a coating apparatus 1 has an extrusion type coating head 2 and a drying unit 3. At the upstream side of the extrusion type coating head 2 is disposed a roll 5 on which a support 4 is wound before coating. At the downstream side of the drying unit 3 is disposed a winding roll 6 for winding the coated and dried support 4 carried through the drying unit 3. In FIG. 1, reference numeral 7 denotes a guide roll.

Figure 2:
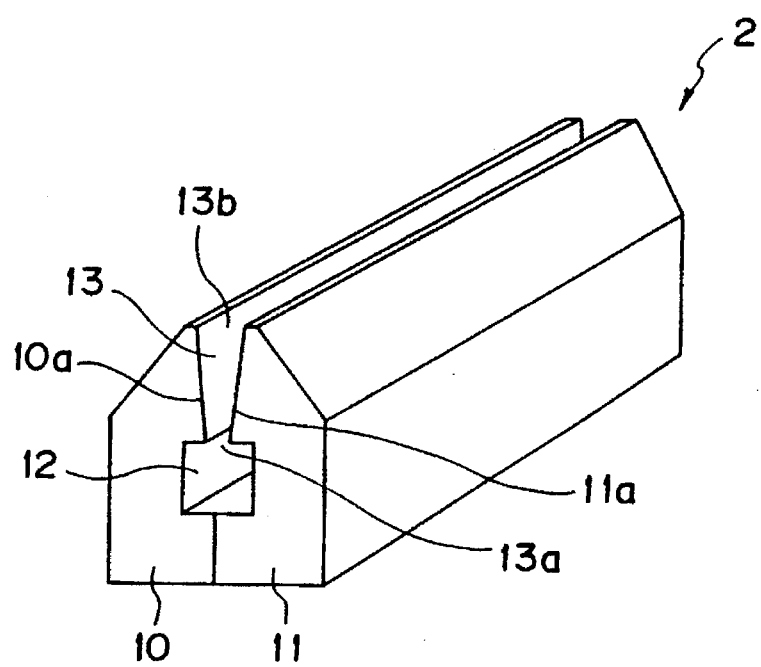
FIG. 2 is a perspective view showing an appearance of an extrusion type coating head constituting a coating apparatus according to the embodiment of the present invention.
Figure 3:
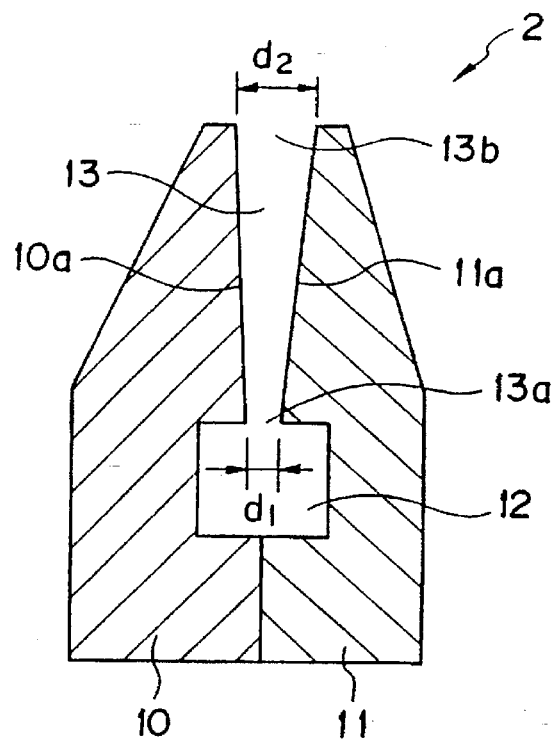
FIG. 3 is a view in cross section showing an embodiment of the extrusion type coating head of FIG. 2.

FIG. 2 is a perspective view showing the extrusion type coating head 2 according to an embodiment of the coating apparatus of the present invention and FIG. 3 is a view in cross section showing the embodiment of the extrusion type coating head 2 of FIG. 2. As shown in FIGS. 2 and 3, the extrusion type coating head 2 comprises a front edge 10 a back edge section 11 wherein and a slit 13 is disposed between the front edge 10 and the back edge 11, extending lengthwise over the entire length of the extrusion type coating head 2. The width of the slit 13 is determined by the distance between the inner wall surface 10a of front edge section 10 and the inner wall surface 11a of back edge section 11. A pocket 12 as a coating liquid reservoir for storing a coating liquid is disposed in communication with the slit 13 and it is further communicated with a flow path (not shown) through which the coating liquid passes. The flow path may have an opening at a given position of a wall surface of the back edge 11 and the pocket 12 is supplied with the coating liquid from an outside coating liquid supply system (not shown). The coating liquid is then extruded from the outlet end of the slit 13 and applied onto the surface of the support at a flow rate in proportion to the fluid pressure of the coating liquid stored in the pocket 12.

The slit 13 has an inner wall surface 10a of the front edge 10 disposed in parallel to and facing the inner wall surface 11a of the back edge 11 apart in a given distance from the inner wall surface 10a thereof. In accordance with the present invention, the slit 13 is disposed such that it is so tapered ("inversely-tapered") as to become wider or expand gradually from its inlet end 13a at a boundary portion with the pocket 12 toward an outlet end 13b through which the coating liquid is extruded so as to apply it onto the support. A slit opening width (d1) of the inlet end 13a and a slit opening width (d2) of the outlet end 13b satisfies the following relationship:

$$5\% \leq [(d2-d1)/d1] \times 100 \leq 20\%,$$

In the above equation, the slit width (d1) means the width of the opening between the two inner wall surfaces 10a and 11a at the inlet end 13a of the slit 13. On the other hand, the slit width (d2) means the width of the opening between the two inner wall surfaces 10a and 11a at the outlet end 13b thereof. In a preferred aspect, the relationship is set to satisfy the following equation:

$$7\% \leq [(d2-d1)/d1] \times 100 \leq 15\%.$$

The reasons for setting the opening distance between the inner wall surfaces of the slit are because, if a so-called tapered amount, as represented by $\{[(d2-d1)/d1] \times 100\}$, is less than 5%, it is difficult to remove aggregates or solid material stayed in a coating liquid from the slit and they may cause the formation of streaks on the surface of a coating, when the coating is resumed after it has been terminated during a certain period of time, and moreover, if the tapered amount is larger than 20%, the coating liquid may be unlikely to flow in a uniform way, thus causing irregularities on the surface of the coating.

Further, it is preferred that the slit opening width (d1) at the inlet end 13a of the slit 13 is set so as to be preferably from 0.05 mm to 0.2 mm and, more preferably, from 0.1 mm to 0.16 mm. If the slit opening width (d1) is less than 0.05 mm, on the one hand, aggregates of the coating liquid stayed in the pocket section may be caught at the slit inlet, thereby causing the formation of streaks on the surface of a coating when the coating is resumed after it has been temporarily terminated during a certain period of time and, if the slit opening width (d1) is larger than 0.2 mm, on the other hand, it may become difficult to control a flow rate of the coating liquid from the slit outlet, thereby causing a variation in film thickness of the coating.

The length of the slit 13 is not limited to any specific length and it may be set to be usually from approximately 10 mm to 50 mm, for example, in order to prepare magnetic recording media by coating a magnetic layer.

The extrusion type coating head 2 of the coating apparatus according to the present invention may be made of a material identical with or similar to one customarily utilized for conventional extrusion type coating heads and such a material may include, for example, stainless steel, superhard alloy or the like.

The extrusion type coating head 2 is disposed such that a coating liquid is supplied to a pocket 12 through a flow path from an outside coating liquid supply system. The supply of the coating liquid to the pocket 12 may be conducted from any portion of the pocket 12, for example, at a one end of the pocket 12, at both ends thereof or at a middle portion thereof.

The coating liquid supplied to the pocket 12 is then fed to the slit 13 from the inlet end 13a of the slit 13 and extruded from the outlet end 13b at a tip of the slit 13 continuously or successively into a space set between the back edge 11 and the support 4 carried from the roll 5. The width of the space between the support 4 and the back edge 11 may be set according to the amount of the coating liquid supplied, the tension of the support 4 against the extrusion type coating head 2 or the like. The coating liquid extruded into the space is then applied to the surface of the support 4, forming a coating thereon.

The slit 13 is so tapered as to become wider or expand gradually from its inlet end 13a toward its outlet end 13b. Further, the slit 13 is disposed in such a manner that the slit opening width (d1) at the inlet end 13a and the slit opening width (d2) at the outlet end 13b satisfy the following relationship:

$$5\% \leq [(d2-d1)/d1] \times 100 \leq 20\%.$$

More preferably, the slit opening width (d1) is set to range from 0.05 mm to 0.2 mm, in addition to compliance with the conditions as defined above. This arrangement of the slit 13 enables smooth removal of aggregates from the outlet 13b to outside merely by extruding the coating liquid for a short period of time without coating when the coating step is resumed after a temporary termination, even if the coating liquid remaining in the pocket 12 is caused to gel into such aggregates during a period of time of the temporary termination and such aggregates are carried into the slit 13 through the inlet end 13a together with a flow of the coating liquid. This can prevent an occurrence of coating irregularities or streaks on the surface of the coat.

Therefore, when the coating step is to be resumed after a temporary termination for a certain period of time, it is preferred that the coating step is allowed to restart after the coating liquid has been extruded, for example, for approximately 10 seconds without coating in order to remove aggregates stayed in the slit 13. This procedure can provide a coating in a uniform film thickness with a less variation in coat film thickness without causing coating irregularities or streaks on the surface of the coat.

In the embodiments as indicated in the accompanying drawings, the slit 13 is tapered such that its front edge 10 and its back edge 11 become wider or expand gradually from their inlet ends 13a to their outlet ends 13b, respectively, at equal rates from its central line therebetween. It is to be understood, however, that the shape of the slit 13 is not limited to this specific embodiment and it may vary as long as the opening width (d1) of the slit at the inlet end and the opening width (d2) of the slit at the outlet end satisfies the conditions as defined hereinabove and, more preferably, the opening width (d1) is defined in the manner as described hereinabove in addition to compliance with the conditions as defined hereinabove. It is further understood that the process for the preparation of the slit 13 is not restricted to a specific one and it may be formed by any conventional processes.

Figure 4:
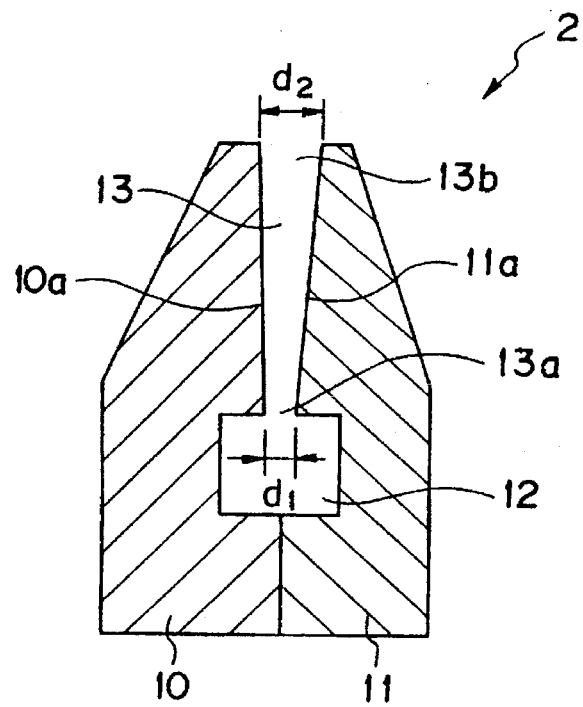
FIG. 4 is a view in cross section showing another embodiment of an extrusion type coating head constituting a coating apparatus according to the present invention.

For example, as shown in FIG. 4, one of the edges, e.g. an inner wall surface 10a of the front edge 10, may be disposed so as to be straight or may not be tapered, and the other, e.g. an inner wall surface 11a of the back edge 11, may be tapered. In any case, however, the opening width between the inner wall surfaces 10a and 11a should be disposed so as to satisfy the conditions as set forth hereinabove.

As the support 4 to be employed for the coating apparatus according to the present invention, it is not limited to a specific one and it may include, for example, a flexible and long support such as a plastic film polyethylene terephthalate film, paper or metallic foil. Further, it may be provided in advance with various treatment layers.

The coating liquid to be employed for the coating apparatus according to the present invention is not restricted to a specific one as long as it is suitable for coating with the extrusion type coating head. The coating liquid may include, for example, a coating liquid for forming a magnetic layer, which may contain magnetic powder, a binder and a solvent, and a coating liquid for forming a back coat, which may contain a pigment, a binder and a solvent.

The extrusion coating method to be applied to the present invention is appropriate for controlling the film thickness of a coating and it has hitherto lent itself to usages that require a stable coat film thickness. As one of such usages, the extrusion coating method may be applied, for example, to the formation of back coat layers or magnetic recording layers of magnetic recording media.

The coating liquid for coating the magnetic layers may contain magnetic powders including, for example, fine powders of an oxide such as $\gamma\text{-}Fe_2O_3$, Co-containing $\gamma\text{-}Fe_2O_3$, $Fe_3O_4$, Co-containing $Fe_3O_4$, $CrO_2$, barium ferrite or strontium ferrite, fine powders of a metal such as Fe, Co or Ni or its alloy or iron carbide or the like. As the binder to be contained in the coating liquid for forming the magnetic layers, there may be employed any known resin binders. The solvent for the coating liquid is not limited to a specific one and there may be appropriately selected from, for example, a solvent of a ketone type, such as cyclohexanone, methyl ethyl ketone and methyl isobutyl ketone, and of an aromatic type such as toluene, in accordance with usage. The coating liquid may further contain fine powders of organic substances and a variety of additives such as a lubricant, as needed. The film thickness of the magnetic layer to be coated with the coating liquid as enumerated above may be from approximately 0.1 to 6 µm as a dry coating. It is further preferred that the magnetic recording layer contains the magnetic powders at the rate of from approximately 30% to 92% by weight. The coat layer may also be formed by applying the coating liquid onto multiple layers in a wet state, as has often been carried out recently. In this case, the coating liquid is not limited to such a magnetic liquid and it may include, for example, a non-magnetic liquid or a solution of a resin. This liquid can also be employed as long as it is suitable for coating with the extrusion type coating head as described hereinabove. Further, the layer structure of the coat layer may be selected in an appropriate manner, as needed.

The coating liquid for forming the back coat may contain powders of a non-magnetic organic substance, such as carbon black, $\alpha\text{-}Fe_2O_3$, $TiO_2$, $CaO$, $SiO_2$, $Cr_2O_3$, $\alpha\text{-}Al_2O_3$, SiC, $CaCO_3$, $BaSO_4$, ZnO, MgO, boron nitride, TiC, and the like, as a pigment. As a binder to be employed for the coating liquid, there may be employed any resin binder known to the art. A solvent is not limited to a specific one and it may be appropriately selected from, for example, a solvent of a ketone type, such as cyclohexanone, methyl ethyl ketone and methyl isobutyl ketone, and of an aromatic type such as toluene, in accordance with usage. The coating liquid for forming the back coat may also contain fine powders of an organic substance or a variety of additives such as a lubricant, as needed. The film thickness of the back coat layer to be coated with the coating liquid may range from approximately from 0.1 µm to 1.0 µm as a dry coat. It is further preferred that the pigment contained in the back coat may amount to from approximately 30% to 80% by weight of the back coat layer.

The present invention will be described more in detail by way of examples with reference to comparative examples.

EXAMPLES AND COMPARATIVE EXAMPLES

As a support, a polyethylene terephthalate film having a width of 1,000 mm and a film thickness of 15 µm was used. The total amounts of raw materials as indicated by Nos. (1) to (10) below were kneaded, dispersed and filtered. To the resulting filtrate was added polyisocyanate, as indicated by No. (11) below, and the mixture was mixed together to give a magnetic coating liquid.

The magnetic coating liquid prepared above has the composition as follows:

| | | |
|---|---|---|
| (1) | Co-containing γ-Fe₂O₃ (Hc = 750 Oe; specific surface area(BET) = 43 m²/g) | 100 parts by weight |
| (2) | Alumina powder | 5 parts by weight |
| (3) | Vinyl chloride-vinyl acetate-vinyl alcohol copolymer (Degree of polymerization = 310; composition rate = 88:6:6) | 10 parts by weight |
| (4) | Polyester-polyurethane resin | 10 parts by weight |
| (5) | Carbon black | 5 parts by weight |
| (6) | Stearic acid | 2 parts by weight |
| (7) | Butyl stearate | 1 part by weight |
| (8) | Methyl ethyl ketone | 100 parts by weight |
| (9) | Toluene | 100 parts by weight |
| (10) | Cyclohexanone | 80 parts by weight |
| (11) | Polyisocyanate | 4 parts by weight |

Using the coating apparatus 1 and the extrusion type coating head 2 as indicated in FIGS. 1 to 3, the resulting coating liquid was extruded from the slit and applied to the surface of the support carried at the speed of 300 meters per minute without coating.

Then, the coating step was temporarily terminated and it was resumed in one hour after aggregates formed during the temporary termination of the coating step were removed from the slit by extruding the coating liquid for about 10 seconds without applying it onto the support.

After the coating was finished, the support 4 was carried to the drying unit 3 and allowed to dry to give a magnetic recording layer having a dry film thickness of 3 µm and the dry support was wound on the winding roll 6.

The coat surface of the rolled support was visually observed for a state of the coat and the state of the coat is rated according to the evaluation standard as will be described hereinbelow. The results are shown in Table 1 below.

The taper amount and the width (d1) and (d2) of the slit of the extrusion type coating head were measured with a three-dimension measuring machine (Model: FJ-604; Mitsutoyo K. K.) by measuring the opening distances between the front edge and the back edge at the bottom end and the upper end of the facing surfaces.

RATINGS OF EVALUATION OF COAT SURFACE

The evaluation for the formation of streaks of a coating is rated as indicated in Table 1 by symbols as follows:

Symbol⊚: No observation of any coat streak over the entire area having the width of 1,000 mm and the length of 10,000 meters.

SymbolO: One or two coat streaks were observed over the entire area having the width of 1,000 mm and the length of 10,000 meters.

Symbolx: Three or more coat streaks were observed over the entire area having the width of 1,000 mm and the length of 10,000 meters.

The evaluation for coating irregularities of a coat is rated as indicated in Table 1 by symbols as follows:

Symbol⊚: No irregularities were found yielding a good coat surface.

SymbolO: Slight irregularities were found; however, no problem with production arose.

Symbolx: Many irregularities were found yielding an irregular coat surface.

The variation in uniform film thickness of a coating was observed with a X-ray film thickness meter Model 3710A (Rigaku K. K.) by measuring a variation in film thickness in the widthwise direction over the coating width of 1,000 mm. A value of the variation is defined as a value equivalent of the maximum variation. The evaluation for the variation in uniform film thickness of the coat is raked as indicated in Table 1 by symbols as follows:

Symbol⊚: Less than 0.21 µm in the widthwise variation in film thickness.

SymbolO: From 0.2 µm to less than 0.4 µm in the widthwise variation in film thickness.

Symbolx: 0.4 µm or larger in the widthwise variation in film thickness.

TABLE 1

| Sample No. | Slit Width (d1) at inlet End (mm) | (*) Taper Amount % | Coating Streaks | Coating Irregularity | Variation in Film Thickness |
|---|---|---|---|---|---|
| 1 | 0.03 | 25 | x | o | ⊚ |
| 2 | 0.03 | 20 | x | o | ⊚ |
| 3 | 0.05 | 25 | o | x | ⊚ |
| 4 | 0.05 | 20 | o | o | ⊚ |
| 5 | 0.05 | 15 | o | ⊚ | ⊚ |
| 6 | 0.05 | 7 | o | ⊚ | ⊚ |
| 7 | 0.05 | 5 | o | o | ⊚ |
| 8 | 0.05 | 0 | x | o | ⊚ |
| 9 | 0.10 | 25 | ⊚ | x | ⊚ |
| 10 | 0.10 | 20 | ⊚ | o | ⊚ |
| 11 | 0.10 | 15 | ⊚ | ⊚ | ⊚ |
| 12 | 0.10 | 7 | ⊚ | ⊚ | ⊚ |
| 13 | 0.10 | 5 | o | ⊚ | ⊚ |
| 14 | 0.10 | 0 | x | ⊚ | ⊚ |
| 15 | 0.16 | 25 | ⊚ | x | ⊚ |
| 16 | 0.16 | 20 | ⊚ | o | ⊚ |
| 17 | 0.16 | 15 | ⊚ | ⊚ | ⊚ |
| 18 | 0.16 | 7 | ⊚ | ⊚ | ⊚ |
| 19 | 0.16 | 5 | o | ⊚ | ⊚ |
| 20 | 0.16 | 0 | x | ⊚ | ⊚ |
| 21 | 0.20 | 25 | ⊚ | x | ⊚ |
| 22 | 0.20 | 20 | ⊚ | o | ⊚ |
| 23 | 0.20 | 15 | ⊚ | o | o |
| 24 | 0.20 | 7 | ⊚ | o | o |
| 25 | 0.20 | 5 | o | o | o |
| 26 | 0.20 | 0 | x | o | o |
| 27 | 0.25 | 25 | ⊚ | x | x |
| 28 | 0.25 | 20 | ⊚ | o | x |

(*) Taper Amount = [(d2-d1)/d1] × 100

As is apparent from Table 1 above, the coating apparatus according to the present invention can provide a coating with a uniform film thickness with less variation in film thickness of the coating because irregularities or streaks of the coating can be prevented from occurring due to the fact that aggregates, even if formed on account of gelation of the coating liquid while stayed in the pocket during a temporary termination of the coating step, can be readily removed from the slit when the coating step is resumed after the temporary termination.

It should be understood that any and all variations and modifications that do not depart from the spirit, the scope and the major features of the present invention should be interpreted as being encompassed within the scope of the present invention. Therefore, it should further be understood that the present invention is not limited in any respect to the particular embodiments and the specific embodiments are described solely for a illustrative purpose, not for any limitative purpose. In addition, it should be understood that the scope of the present invention is interpreted by the appended claims and is not bound by the description of the specification and that any and all changes and modification belonging to equivalency to the scope of the appended claims should be interpreted as being encompassed within the scope of this invention.

What is claimed is:

1. A coating apparatus, which comprises an extrusion coating head disposed to coat a surface of a support with a coating liquid by extruding the coating liquid continuously or successively from a slit formed between opposite inner walls of the coating head, wherein the slit is tapered so as to become wider gradually from an inlet end thereof to an outlet end thereof and allow the coating liquid to be extruded toward the outlet end of the slit, through which the coating liquid is applied onto the surface of the support and wherein an opening slit width (d1) at the inlet end of the slit and an opening slit width (d2) at the outlet end thereof satisfies the following relations:

$$5\% \leq [(d2-d1)/d1] \times 100 \leq 20\%.$$

2. The coating apparatus as claimed in claim 1, wherein said opening slit width (d1) and said opening slit width (d2) satisfies the following relations:

$$7\% \leq [(d2-d1)/d1] \times 100 \leq 15\%.$$

3. The coating apparatus as claimed in claim 2, wherein said opening slit width (d1) at the inlet end of the slit is from 0.05 mm to 0.2 mm.

4. The coating apparatus as claimed in claim 2, wherein said opening slit width (d1) at the inlet end of the slit is set to be from 0.1 mm to 0.16 mm.

5. The coating apparatus as claimed in claim 1, wherein said opening slit width (d1) at the inlet end of the slit is from 0.05 mm to 0.2 mm.

6. The coating apparatus as claimed in claim 1, wherein said opening slit width (d1) at the inlet end of the slit is set so as to be from 0.1 mm to 0.16 mm.

* * * * *